United States Patent
Miyake et al.

(10) Patent No.: US 7,157,160 B2
(45) Date of Patent: Jan. 2, 2007

(54) MAGNETIC THIN FILM AND METHOD OF MANUFACTURING THE SAME

(75) Inventors: Yuko Miyake, Kawasaki (JP); Daiju Kaneko, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/796,713

(22) Filed: Mar. 8, 2004

(65) Prior Publication Data

US 2005/0053802 A1    Mar. 10, 2005

(30) Foreign Application Priority Data

Sep. 9, 2003   (JP) ............... 2003-317040

(51) Int. Cl.
*G11B 5/127*   (2006.01)

(52) U.S. Cl. .............. 428/812; 428/815.2; 428/816; 360/122

(58) Field of Classification Search ............. None
See application file for complete search history.

(56) References Cited

U.S. PATENT DOCUMENTS

| | | | | |
|---|---|---|---|---|
| 3,699,553 A | * | 10/1972 | Belson et al. ............... | 365/171 |
| 6,120,918 A | * | 9/2000 | Osaka et al. ................ | 428/812 |
| 6,132,892 A | * | 10/2000 | Yoshikawa et al. ......... | 428/812 |
| 6,507,464 B1 | * | 1/2003 | Ohashi et al. .............. | 360/317 |
| 6,661,606 B1 | * | 12/2003 | Sano et al. .................. | 360/126 |
| 6,765,757 B1 | * | 7/2004 | Kawasaki et al. .......... | 360/126 |
| 7,101,633 B1 | * | 9/2006 | Yamaguchi et al. ..... | 428/815.2 |
| 2002/0131205 A1 | * | 9/2002 | Gotoh et al. ................ | 360/126 |
| 2004/0053077 A1 | * | 3/2004 | Kawasaki et al. ... | 428/694 MT |

FOREIGN PATENT DOCUMENTS

| JP | 2002-280217 | 9/2002 |
|---|---|---|
| JP | 2003-034891 | 2/2003 |
| JP | 2003-045719 | 2/2003 |
| JP | 2003-077723 | 3/2003 |

* cited by examiner

*Primary Examiner*—Kevin M. Bernatz
(74) *Attorney, Agent, or Firm*—Greer, Burns & Crain, Ltd

(57) ABSTRACT

The magnetic thin film has high saturation magnetic flux density and superior soft magnetic characteristics. The magnetic thin film of the present invention comprises: a base layer being made of FeCo/NiFe; and a plated layer being formed on the base layer, the plated layer being made of FeCo.

6 Claims, 5 Drawing Sheets

MAGNETIC THIN FILM AND METHOD OF MANUFACTURING THE SAME

BACKGROUND OF THE INVENTION

The present invention relates to a magnetic thin film, a method of manufacturing the magnetic thin film, and a magnetic head including the magnetic thin film, more precisely relates to a magnetic thin film, which is formed by plating and which has high saturation magnetic flux density and a low coercive force, a method of manufacturing the same, and a magnetic head including the same.

A schematic sectional view of a conventional magnetic head of a magnetic disk drive unit is shown in FIG. 2. A symbol 12 stands for an MR head; a symbol 10 stands for a lower shielding layer of the MR head 12; and a symbol 14 stands for an upper shielding layer 14 of the MR head 12. The upper shielding layer 14 acts as a lower magnetic pole of a write-head section.

The lower magnetic pole 14 has an end magnetic pole section 16, and a surface of the end magnetic pole section 16 is covered with a magnetic layer 17. An upper magnetic pole 18 is provided to face the lower magnetic pole 14. A magnetic thin film 19 covers an inner face of the upper magnetic pole 18 and faces the magnetic layer 17. A write-gap "A" is formed between the magnetic layer 17, which covers the end pole section 16 of the lower magnetic pole 14, and the magnetic thin film 19. Symbols 20 stand for coils.

In the magnetic head for high recording density, the narrow write-gap "A" is narrow, a width of a front end of a write head core is made as narrow as possible, saturation magnetic flux density "Bs" of a material of the write-head section is made as great as possible, and the material of the write-head section has soft magnetism or a small coercive force. If the coercive force of the material is great, current responsibility is low when the magnetic head is driven, so that recording characteristics are made worse. Especially, hysteresis loss, which causes problems in a high frequency band, is caused, so that the recording characteristics in the high frequency band are made worse.

As shown in FIG. 2, a front part of the upper magnetic pole 18 is bent like a step so as to concentrate fluxes to a front end of the write-head section, and its thickness is about 3–4 μm. Therefore, the magnetic pole is formed by a plating process, which has high eleposition efficiency and which is capable of highly selectively forming films.

Conventionally, the magnetic film (saturation magnetic flux density Bs≅1.5 T) of the magnetic pole of the write-head section is a 45 NiFe film formed with DC current. These days, magnetic films having greater saturation magnetic flux density are required with increasing recording density.

Many magnetic films are disclosed. For example, a plated film made of CoNiFe (see Japanese Patent Gazette No. 11-741227), a plated film made of NiFe (see Japanese Patent Gazette No. 2002-208109) and plated films made of CoFe (see Japanese Patent Gazettes No. 2002-280217, No. 2003-45719 and No. 2003-34891) are known.

In Japanese Patent Gazette No. 11-741227, the plated film made of CoNiFe has saturation magnetic flux density Bs≧2.0 T and good soft magnetism. However, stress of the plated film is great, so thickness of the plated film must be severe.

In Japanese Patent Gazette No. 2002-208109, the plated film made of NiFe has high saturation magnetic flux density Bs=1.9 T and high corrosion resistance. However, the saturation magnetic flux density do not reach that required now.

In the plated films disclosed in Japanese Patent Gazettes No. 2002-280217 and No. 2003-45719, Fe is employed as a main element so as to have higher saturation magnetic flux density. Japanese Patent Gazette No. 2002-280217 discloses a method of manufacturing the FeCo plated film having higher saturation magnetic flux density Bs=2.25-2.3 T. Japanese Patent Gazette No. 2003-45719 discloses the FeCo film, which includes a third noble metal element so as to improve corrosion resistance. The FeCo film has higher saturation magnetic flux density Bs=2.2 T and high corrosion resistance. However, coercive forces of the magnetic films disclosed in Japanese Patent Gazettes No. 2002-280217 and No. 2003-45719 are 1500 A/m or more, which is greater than conventional films having soft magnetism. Therefore, they make recording characteristics of magnetic heads worse.

Conventionally, the coercive force of a magnetic material is reduced by two ways. One is mixing impurities in a plated film so as to microcrystallize the plated film. The other is a heat treatment at high temperature. However, impurities should be removed from the FeCo film and the CoNiFe film for higher saturation magnetic flux density. And, the heat treatment for the write-head section is executed in a final process of manufacturing a magnetic head, so the heat treatment should be performed in a prescribed temperature range, in which a read-head section is not badly influenced. Therefore, it is difficult to manufacture the CoFe plated film having the higher aturation magnetic flux density and the small corcive force.

A base film is required so as to form the plated film. Composition and saturation magnetic flux density of the base film are almost equal to those of the plated film, and the base film is formed in a vacuum apparatus. For example, the base film having high saturation magnetic flux density is made of FeN, FeCo, FeCoO and FeCoA10. FeCoO and FeCoA10 have high specific resistance, e.g., about 100 μΩ cm, so thickness of the base film is apt to vary and they are not proper as materials of the base film. On the other hand, FeN and FeCo have high saturation magnetic flux density and low specific resistance, so they are proper materials of the base film. However, they have low corrosion resistance to acidic liquids, so that they are dissolved by plating solution.

SUMMARY OF THE INVENTION

The present invention was invented to solve the above described disadvantages of the conventional magnetic films.

An object of the present invention is to provide a magnetic thin film having high saturation magnetic flux density and superior soft magnetic characteristics.

Another object of the present invention is to provide a method of manufacturing said magnetic thin film.

Further, an object of the present invention is to provide a magnetic head including said magnetic thin film.

To achieve the objects, the present invention has following structures.

The magnetic thin film of the present invention comprises: a base layer being made of FeCo/NiFe; and a plated layer being formed on the base layer, the plated layer being made of FeCo. Corrosion resistance of NiFe to acidic liquids is superior to that of FeCo, so the FeCo/NiFe layer is used as the base layer of the FeCo plated layer. Therefore, the base layer is not corroded by plating solution while the plated layer is formed in the plating solution.

Another magnetic thin film comprises: a plated layer being made of FeCoRu, wherein composition of FeCoRu is indicated as $Fe_xCo_yRu_z$ (x+y+z=100 at %), composition ratio of Fe is $50 \leq x \leq 80$ at %, composition ratio of Co is $20 \leq y \leq 50$ at %, and composition ratio of Ru is $0.2 \leq z \leq 1$ at %. With this structure, the coercive force of the FeCo plated layer can be lowered. Namely, FeCo is microcrytallized, so that columnar growth is restricted and the coercive force can be lowered. In this method, saturation magnetic flux density of the plated layer may be $Bs \geq 1.9$ T, and a coercive force in a direction of a hard axis may be $Hc \leq 160$ A/m.

In the method of the present invention, the magnetic thin film is formed by pulse plating. In this method, an electric current is periodically inputted to plating solution like pulses, so that the FeCo layer, which has a bcc structure and which is apt to columnar-grow, can be formed flat.

In another method of the present invention, the plated layer is plated in a plating solution including an organic additive, which includes a structure of [=C—SO2—][—C—N—]. And, the plating solution may further include an electric conductive agent whose cation is an alkali metal. The glossy magnetic thin film, whose thickness is 5 μm or more, can be manufactured. The electric conductive agent whose cation is an alkali metal can lower impurity concentration of the FeCo plated layer, so that saturation magnetic flux density can be improved.

Further, the magnetic head of the present invention comprises: an upper magnetic pole; a lower magnetic pole; a write-gap being formed between the upper magnetic pole and the lower magnetic pole; and magnetic films being provided to parts of the upper magnetic pole and the lower magnetic pole, which are located at peripheries of the write-gap, wherein each of the magnetic films comprises: a base layer being made of FeCo/NiFe; and a plated layer being formed on the base layer, the plated layer being made of FeCo.

In the present invention, the magnetic thin film comprises the FeCo/NiFe base layer and the FeCo plated layer formed on the base layer. Therefore, the magnetic thin film has high saturation magnetic flux density and good soft magnetism, so that it can be a proper magnetic thin film of the magnetic head. The FeCo plated layer can be thick, the magnetic thin film can be applied to all types of magnetic heads, the magnetic head including the magnetic thin film is capable of recording data in a recording medium having a high coercive force, and recording density can be improved. Since dissolution of the base layer can be prevented during the plating process, reliability and manufacturing efficiency of the magnetic heads can be improved.

For example, Ru of 1 at % or less is added to FeCo, the coercive force in the direction of a hard axis can be $Hc \leq 160$ A/m, the magnetic thin film having enough soft magnetism can be used for magnetic heads.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings.

Figure 1:
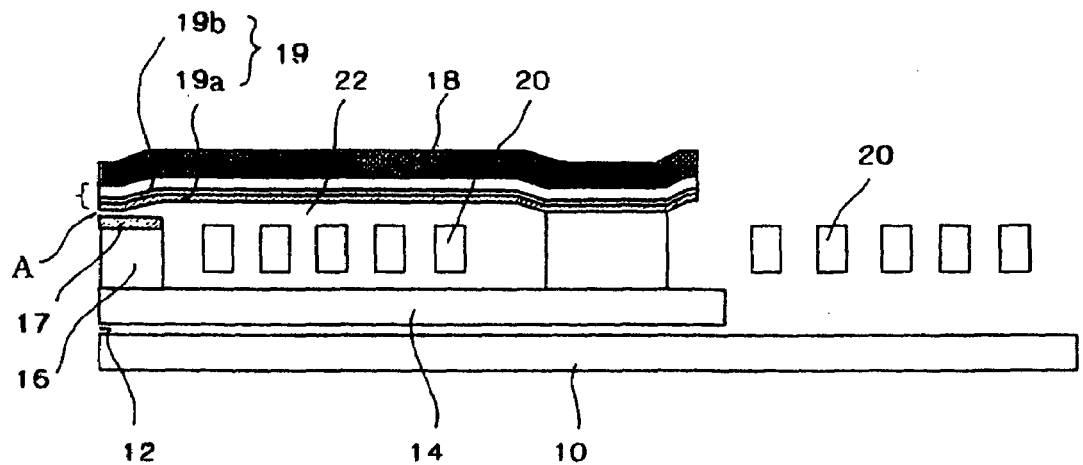
FIG. 1 is a schematic sectional view of a magnetic head of an embodiment of the present invention.
Figure 2:
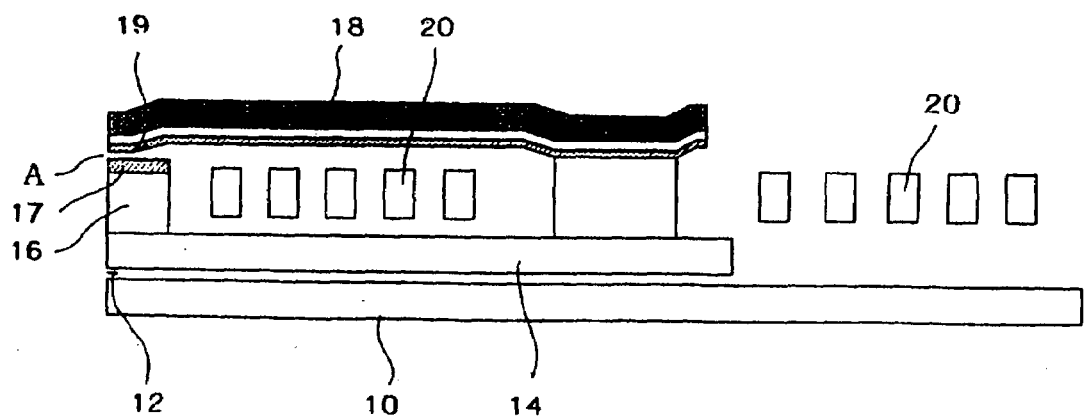
FIG. 2 is a schematic sectional view of the conventional magnetic head.
Figure 3:
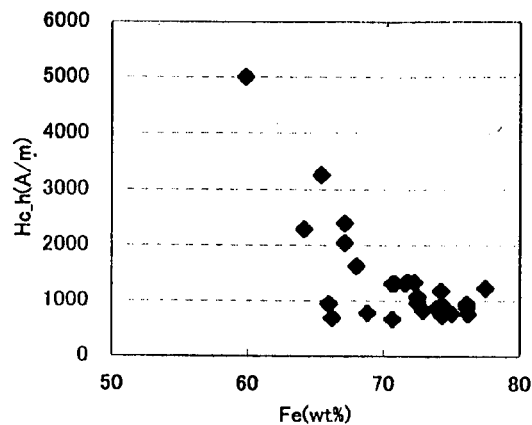
FIG. 3 is a graph of a coercive force in a hard axis direction of an FeCo layer of a conventional magnetic thin film.

FIG. 1 is a schematic sectional view of a magnetic head of an embodiment. The magnetic head includes: a lower shielding layer 10; an MR head 12; a lower magnetic pole 14; an upper magnetic pole 18; and coils 20. The basic structure of the magnetic head is similar to the conventional one shown in FIG. 2.

The feature of the magnetic head of the present embodiment is a magnetic thin film 19, which is formed on the upper magnetic pole 18 and which faces a write-gap A. The magnetic thin film 19 comprises: a base layer 19a made of piled FeCo/NiFe; and a plated layer 19b made of FeCo.

Since the plated layer 19b made of FeCo is formed on the base layer 19a made of FeCo/NiFe, the magnetic thin film 19 has high saturation magnetic flux density and a low coercive force. By employing the magnetic thin film 19 as at least a part of magnetic pole cores facing the write-gap A, recording density can be highly improved.

Note that, a magnetic layer 17 of an end magnetic pole section 16 of the lower magnetic pole 14 may be made of the magnetic thin film, which included the base layer 19a made of FeCo/NiFe and the plated layer 19b made of FeCo.

Next, a method of manufacturing the magnetic thin film of the present embodiment will be explained.

In the present embodiment, the magnetic thin film is formed on a substrate made of $Al_2O_3$—TiC. Firstly, a piled FeCo/NiFe layer is formed on the substrate, as the base layer, by plating. The base layer is formed by the steps of: forming an FeCo layer by spattering; and forming a NiFe layer on the FeCo layer by spattering. In the present embodiment, a Ti layer, whose thickness is 5–10 nm, is formed on the substrate so as to improve adhesion between the substrate and the magnetic thin film.

In the NiFe layer, when Ni<45 wt %, a bcc structure appears in crystals, and the coercive force is increased; when Ni>85 wt %, vertical anisotropy appears, and the the coercive force is increased. Therefore, the preferable NiFe layer is formed when 45≦Ni≦85 wt %, so that the NiFe layer having an fcc structure and a low coercive force can be formed.

Figure 9:
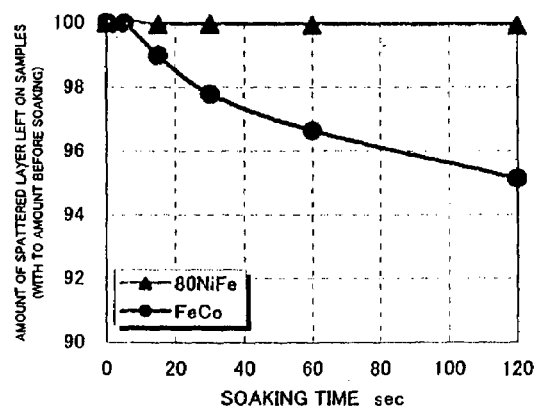
FIG. 9 is a graph showing dissolution rate of a Ni80Fe spattered layer and an Fe70Co spattered layer in an FeCo plating solution.

FIG. 9 shows dissolution rate of a Ni80Fe spattered layer and an Fe70Co spattered layer in an FeCo plating solution. Samples were the Ni80Fe spattered layer formed on a substrate and the Fe70Co spattered layer formed on a substrate, and they were soaked in the FeCo plating solution. Amounts of the spattered layers left on surfaces of the samples with respect to soaking time were measured. According to FIG. 9, the dissolution rate (%) of the two were quite different. Namely, the dissolution rate of the NiFe spattered layer was much slower than that of the FeCo spattered layer. Therefore, the NiFe layer can protects dissolution of the FeCo layer.

On the other hand, the preferable FeCo spattered layer has high saturation magnetic flux density. Namely, its composition range is almost equal to that of the FeCo plated layer, e.g., 50≦Fe≦80 wt %.

Thickness of the plated base layer is designed on the basis of sheet resistance, saturation magnetic flux density, dissolution during plating, etc.

If the thickness is too thin, the sheet resistance increases, so that the thickness of the plated base layer varies. When the thickness of the FeCo layer and the NiFe layer are 100 nm or more, the sheet resistance is 4 Ω/sq or less. A preferred thickness of the base layer is 100 nm or more, in which the sheet resistance is 4 Ω/sq or less. The variation of the thickness of the base layer can be limited to ±5% or less by adjusting conditions of forming the base layer.

A property of restraining dissolution of the FeCo/NiFe base layer and the saturation magnetic flux density thereof are varied by balance of thickness of the NiFe spattered layer and the FeCo spattered layer. The saturation magnetic flux density of the FeCo/NiFe piled layer is lowered with making the NiFe layer thicker. A property of restraining dissolution of the FeCo layer is lowered with making the NiFe layer thinner. If the thickness of the NiFe layer is made thinner, the saturation magnetic flux density of the FeCo/NiFe piled layer can be greater. However, if the thickness of the NiFe layer is too thin, the effect of restraining dissolution of the FeCo layer cannot be gained. To gain the effect, the minimum thickness of the NiFe layer is 10 nm. Therefore, the thickness of the NiFe layer should be 10 nm or more, so, in the present embodiment, the thickness of the NiFe layer is 20 nm and the total thickness of the FeCo/NiFe base layer is 150 nm.

Composition of plating solution for plating the FeCo layer on the base layer is shown in TABLE 1. Plating conditions are shown in TABLE 2. Not that, the plating solution includes a sulfate reagent of the metals, boric acid, an electric conductive agent and a stress relieving agent so as to supply Co ions and Fe ions.

TABLE 1

| CONTENTS | CONCENTRATION (g/l) |
|---|---|
| BORIC ACID | 8–40 |
| ELECTRIC CONDUCTIVE AGENT | 4–60 |
| FERROUS SULFATE | 5–25 |
| COBALT SULFATE | 3–25 |
| STRESS RELIEVING AGENT | 0.2–3 |
| SURFACE ACTIVE AGENT | 0–1 |

TABLE 2

| CONDITION | |
|---|---|
| TEMPERATURE OF SOLUTION (° C.) | 15–35 |
| pH | 2.0–3.0 |
| AVERAGE CURRENT DENSITY (mA/cm$^2$) | 3–50 |
| DUTY RATIO (%) | 3–50 |
| FREQUENCY (Hz) | 0.1–100 |

The stress relieving agent is an organic matter, which includes a structure of [=C—SO2—][—C—N—], e.g., saccharin sodium. The stress relieving agent including the structure of [=C—SO2—][—C—N—] adsorbs metal ions or boundary surfaces of metallic layers with an adsorption property of N in the structure, so that S is included in the layers. By including S in the layers, stress in the magnetic film can be relieved, and a surface of the magnetic film can be flat.

Other additives including a structure of [=C—SO2—] and no [—C—N—], e.g., 1,3,6-Naphthalenetrisulfonic Acid Trisodium Salt, 1,5-Naphthalenedisulfonic Acid Disodium Salt, may be added to the FeCo plating solution. However, the stress relieving effect of the organic additive, which includes the structure of [=C—SO2—][—C—N—], is greater, so the organic additive is a preferable stress relieving agent.

Amount of the stress relieving agent included in the magnetic thin film is varied according to not only its chemical absorption property but also ions in the plating solution. For example, if ions including nitrogen, e.g., ammonium ions, exist in the solution, the chemical absorption property of nitrogen accelerates to mix the stress relieving agent into the magnetic thin film. This function is remarkable when resist patterns exist. However, if it accelerates too much, the saturation magnetic flux density of the film is lowered.

Figure 10:
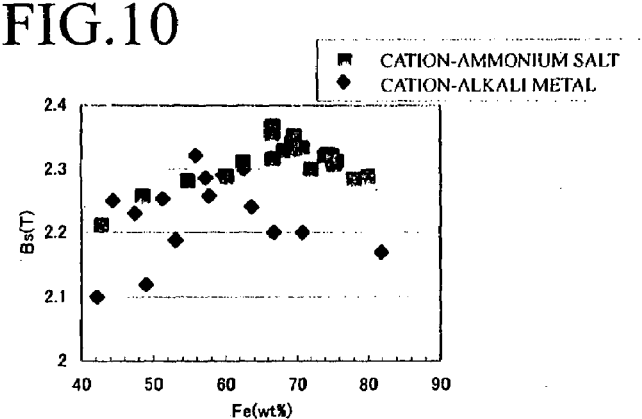
FIG. 10 is a graph showing composition dependence of saturation magnetic flux density of the FeCo plated layer of the embodiment with respect to cations added to the plating solution.

In the case of using the organic stress relieving agent including the structure of [=C—SO2—][—C—N—], the preferred electric conductive agent should be selected. In the electric conductive agent, cation is an alkali metal, chloride including hydrogen, sulfate or sulfamate. For example, sodium chloride, potassium chloride, lithium chloride, sodium sulfate, etc. may be used as cation. Composition dependence of the saturation magnetic flux density (Bs) of the FeCo plated layer of the embodiment with respect to the cations added to the plating solution is shown in FIG. 10. Further, concentration of impurities in the FeCo plated layers, whose cations are different, are shown in TABLE 3.

TABLE 3

| POSITIVE IONS | ALKALI METAL | AMMONIUM ION | ALKALI METAL | AMMONIUM ION |
|---|---|---|---|---|
| B | 9.00E−05 | 9.00E−05 | 0 | 4.10E−04 |
| Na | 7.00E−03 | 1.00E−05 | 1.90E−03 | 0 |
| K | 1.00E−05 | 0 | 1.60E−04 | 1.80E−04 |
| Fe | 1 | 1 | 1 | 1 |
| Co | 1.00E−01 | 9.00E−02 | 2.10E−01 | 2.70E−01 |
| NEGATIVE IONS | ALKALI METAL | AMMONIUM ION | | |
| H | 7.00E−01 | 8.00E−01 | 3.50E−01 | 6.00E−01 |
| C | 5.00E+00 | 7.00E+00 | 5.00E+00 | 1.30E+01 |
| O | 4.00E+01 | 5.00E+01 | 4.00E+01 | 1.60E+03 |
| F | 9.00E−03 | 5.00E−03 | 0 | 9.00E+00 |
| CN | 5.00E−02 | 2.00E−01 | 0 | 1.40E+00 |
| S | 8.00E+00 | 1.00E+01 | 1.50E+02 | 3.60E+02 |

TABLE 3-continued

| Cl | 4.00E+00 | 8.00E+00 | 4.00E+00 | 1.40E+01 |
| Fe | 1 | 1 | 1 | 1 |
| Co | 2.00E+00 | 2.00E+0 | 4.00E+00 | 4.00E+00 |

The concentration of the impurities were measured by an SIMS procedure. The concentration of the impurities were indicated by intensity ratio with respect to the concentration (detected peak intensity) of Fe ion, which was defined as 1. According to the results, the alkali metal, which was employed as the cation of the electric conductive agent, effectively restrained a lowering of the saturation magnetic flux density more than ammonium ion. Further, the alkali metal slightly restrained the concentration of the impurities in the FeCo played layer more than ammonium ion.

Ammonium chloride has high electric conductivity, so it may be used as the electric conductive agent. In the case that saccharin sodium was used as the stress relieving agent, unlike the cation of the alkali metal, the saturation magnetic flux density of the plated layer was lowered, so the preferred cation is the alkali metal. In the present embodiment, sodium chloride was used as the electric conductive agent.

The thin FeCo plated layer was formed on the substrate, whose layer structure was $Al_2O_3$—Tic/Ti/FeCo/NiFe, by electrolytic plating. The electrolytic plating was executed in a DC magnetic field of about 35 kA/m.

Next, plating conditions of forming the FeCo plated layer will be explained.

A preferred pH value of a plating solution is 2.0–3.0 so as to improve current efficiency and restrain oxidization of Fe ions. In the present embodiment, the pH value was 2.3. The pH values was adjusted by sulfuric acid, but it may be adjusted by hydrochloric acid. To increase the pH value, ammonia may be used. By adding sodium hydroxide to the plating solution, hydroxides deposit in the solution, so it is not proper for adjusting the pH value.

A pulse current was inputted to the plating solution. Average current density of the pulse current was 3–50 mA/cm$^2$, duty cycle was 5–50% and frequency was 0.1–100 Hz. The plated layer may be formed with a DC current. In the case of plating with the DC current, the saturation magnetic flux density and the coercive force of the plated layer were almost equal, but a surface of the plated layer was rougher. Flatness of the FeCo layer plated with pulse current was Ra$\leq$5 nm, so it was similar to the flatness of the NiFe layer.

Temperature of the plating solution was 15–35° C. If it is too high, oxidization of Fe is accelerated, so that a span of life of the plating solution becomes short. Therefore, the preferred temperature is 30° C.

The coercive forces in the direction of hard axis and orientation ratio of the base layers, which were made of NiFe and FeCo, are shown in TABLE 4.

TABLE 4

| BASE LAYERS | STRUCTURE/ ORIENTATION | COERCIVE FORCE OF FeCo LAYER (A/m) | ORIENTATION OF FeCo LAYER I110/I220 |
|---|---|---|---|
| NiFe | fcc STRUCTURE ORIENTATED TO (111) | 600 OR LESS | 0.5–0.8 |
| FeCo | bcc STRICTURE ORIENTATED TO (111) | 750 OR MORE | 0.9 OR MORE |

Figure 4:
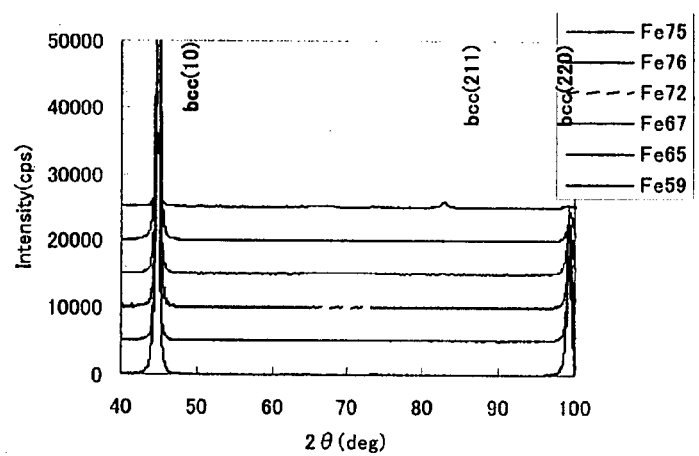
FIG. 4 is a graph of X-ray diffraction patterns of the FeCo layer of the conventional magnetic thin film.

FIG. 4 is a graph of a coercive force in the hard axis direction of the FeCo layer of the conventional magnetic thin film, and FIG. 4 is a graph of X-ray diffraction patterns of the FeCo layer of the conventional magnetic thin film.

Figure 5:
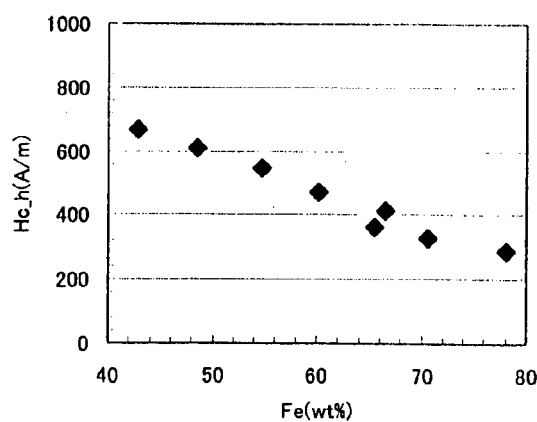
FIG. 5 is a graph of a coercive force in a hard axis direction of the magnetic thin film of the embodiment.
Figure 6:
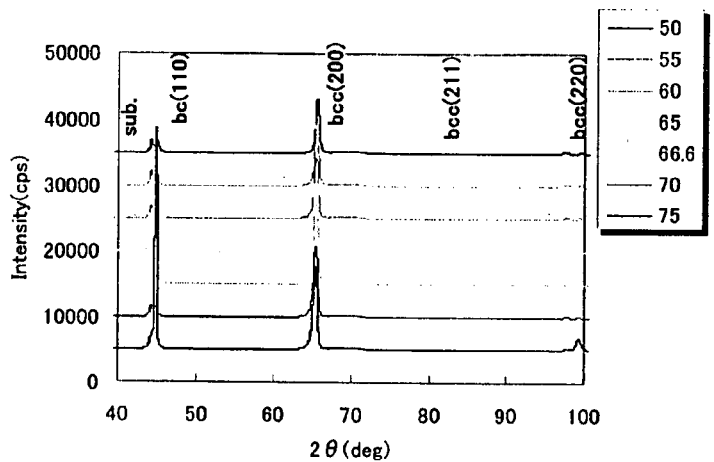
FIG. 6 is a graph of X-ray diffraction patterns of the magnetic thin film of the embodiment.
Figure 7:
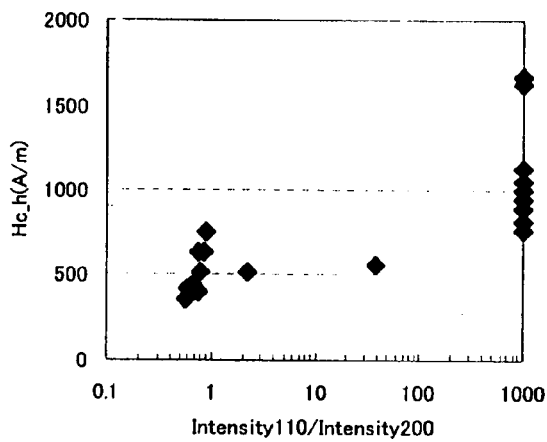
FIG. 7 is a graph of the coercive force, in the hard axis direction, of an FeCo plated layer of the embodiment with respect to intensity ratio of bcc (110) and bcc (200) of X-ray diffraction peaks.
Figure 8:
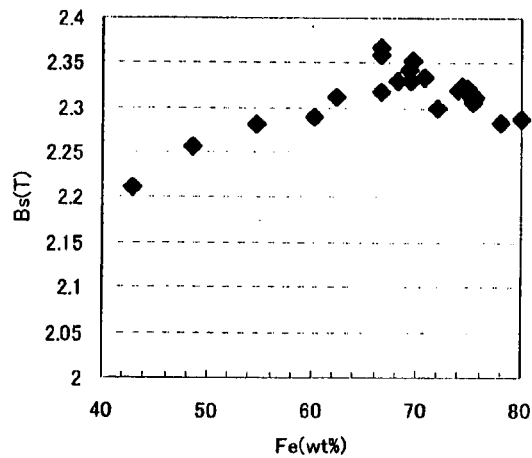
FIG. 8 is a graph showing composition dependence of saturation magnetic flux density of the FeCo plated layer of the embodiment.

On the other hand, FIG. 5 is a graph of the coercive force in the hard axis direction of the magnetic thin film of the embodiment, and FIG. 6 is a graph of X-ray diffraction patterns of the magnetic thin film of the embodiment. Further, FIG. 7 is a graph of the coercive force, in the hard axis direction, of the FeCo plated layer of the embodiment with respect to the intensity ratio of bcc (110) and bcc (200) of X-ray diffraction peaks, and FIG. 8 is a graph showing composition dependence of the saturation magnetic flux density of the FeCo plated layer of the embodiment.

According to FIGS. 3–8 crystal orientation of the magnetic thin film of the present embodiment, in which the plated layer was plated on the NiFe/FeCo spattered layer, was different from that of the conventional magnetic thin film, in which the FeCo layer was plated on the FeCo spattered layer. The conventional thin film was orientated to bcc (110); the thin film of the present embodiment was orientated to bcc (200).

The coercive force in the direction of the hard axis of the conventional thin film was 600 A/m or more in a range of 50$\leq$Fe$\leq$80 wt %, in which high saturation magnetic flux density could be expected. On the other hand, the coercive force in the direction of the hard axis of the thin film of the present embodiment was 600 A/m or less in a range of I110/I200<0.8. Note that, I110/I200 is ratio of an X-ray diffraction peak of bcc (110) and that of bcc (200).

Therefore, in the present embodiment, the coercive force of the FeCo plated layer, which was formed on the FeCo/NiFe layer, was 600 A/m or less in the range of 50$\leq$Fe$\leq$80 wt %, and 400 A/m or less in the range of 65$\leq$Fe$\leq$75 wt %. The saturation magnetic flux density (Bs) was 2.25 T or more in the range of 50$\leq$Fe$\leq$80 wt %, and 2.3 T or more in the range of 65$\leq$Fe$\leq$75 wt %. Note that, in the case of Fe$\cong$70 wt %, the Bs was 2.35 T, and the coercive force in the direction of the hard axis was 400 A/m or less.

Figure 11:
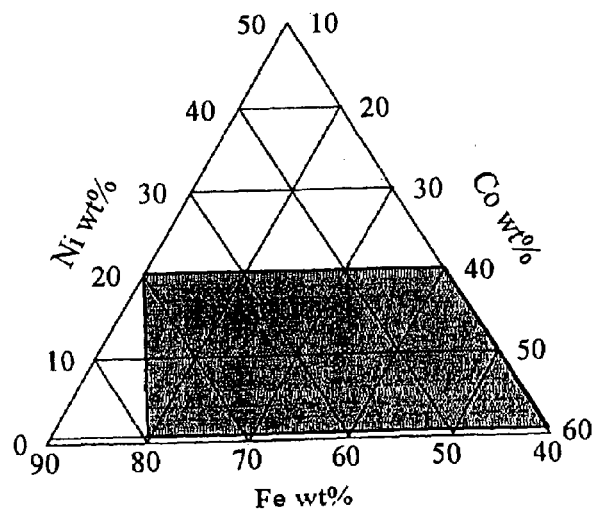
FIG. 11 is an explanation view of a composition range of an FeCoNi layer.

Even in the case of having the bcc structure, in which is apt to columnar-grow and crystals are apt to become large, the orientation of the plated layer can be effectively controlled by the base layer. The similar effect was observed in an FeCoNi layer whose composition range is shown in FIG. 11. The composition range is indicated as a dark trapezoid area enclosed by Fe80Co20, Fe40Co60, Fe40Co40Ni20, Fe70Co10Ni20 and Ni$\geq$1 wt %. In that range, Bs was 2.2 T and the coercive force of the FeCoNi layer could be effectively reduced.

Next, the magnetic thin film including an FeCoRu plated layer will be explained.

A plating solution of forming the FeCoRu plated layer is shown in TABLE 5, and conditions of forming the layer are shown in TABLE 6.

TABLE 5

| CONTENTS | CONCENTRATION (g/l) |
|---|---|
| BORIC ACID | 8–40 |
| ELECTRIC CONDUCTIVE AGENT | 4–60 |
| FERROUS SULFATE | 5–25 |
| COBALT SULFATE | 3–25 |
| RUTHENIUM CHLORIDE | 0.001–0.1 |
| STRESS RELIEVING AGENT | 0.2–3 |
| SURFACE ACTIVE AGENT | 0–1 |

TABLE 6

| CONDITIONS | |
|---|---|
| TEMPERATURE OF SOLUTION (° C.) | 20–35 |
| pH | 2.0–3.0 |
| AVERAGE CURRENT DENSITY (mA/cm$^2$) | 3–25 |
| DUTY RATIO (%) | 5–75 |
| FREQUENCY (Hz) | 0.1–100 |

Figure 12:
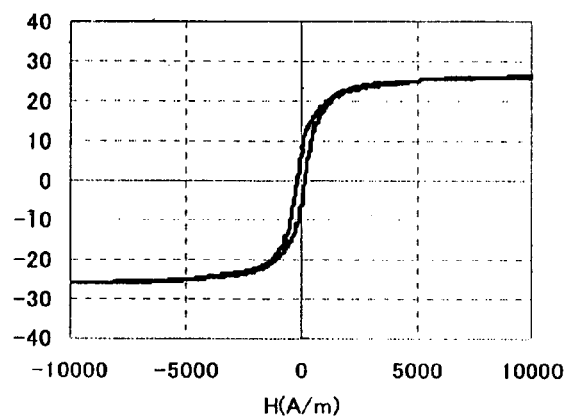
FIG. 12 is a graph showing B-H curves of an FeCoRu plated layer (Ru<1 at %)
Figure 13:
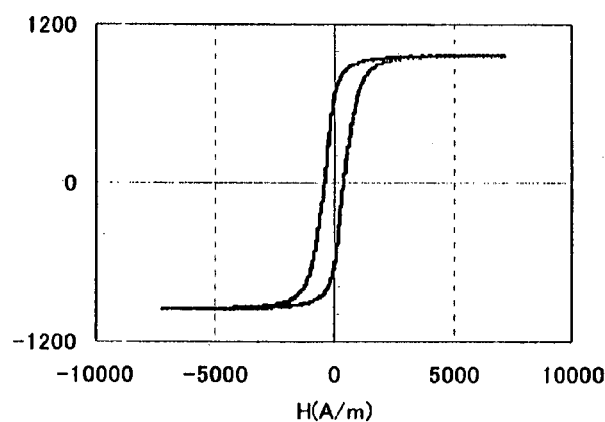
FIG. 13 is a graph showing B-H curves of the FeCo plated layer.
Figure 14:
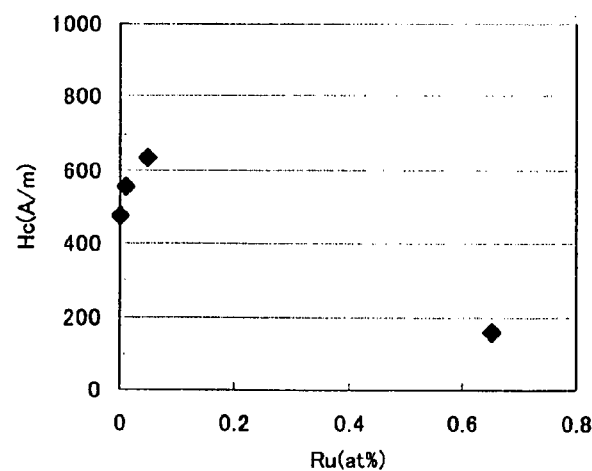
FIG. 14 is a graph of the coercive force of the FeCoRu plated layer with respect to an amount of Ru.

FIG. 12 is a graph showing B-H curves of the FeCoRu plated layer (Ru<1 at %), FIG. 13 is a graph showing B-H curves of the FeCo plated layer, and FIG. 14 is a graph of the coercive force of the FeCoRu plated layer with respect to an amount of Ru. According to FIGS. 12–14, the coercive force of the FeCoRu plated layer was obviously reduced to 160 A/m or less by adding Ru≅0.65 at %. By adding Ru, diameters of crystals of the FeCo plated layer were changed from 20–50 nm to several nm, so that the columnar growth was restrained.

By adding Ru, the saturation magnetic flux density (Bs) of the FeCoRu plated layer was about 1.9 T, which was lower than the Bs of the FeCo plated layer. Therefore, the FeCoRu plated layer is not proper to employ as the magnetic layer provided in the vicinity of a write-gap of a magnetic head, but it is a material having a low coercive force and high Bs. Namely, the FeCoRu plated layer may be employed as a core member of at least one of the lower magnetic pole and the upper magnetic pole, between which the write-gap is formed. Note that, a structure of the base layer, on which the FeCoRu layer is plated, is not limited.

The invention may be embodied in other specific forms without departing from the spirit or essential characteristics thereof. The present embodiments are therefore to be considered in all respects as illustrative and not restrictive, the scope of the invention being indicated by the appended claims rather than by he foregoing description and all changes which come within the meaning and range of equivalency of the claims are therefore intended to be embraced therein.

What is claimed is:

1. A magnetic thin film, comprising:
a base layer being made of $Fe_xCo_{1-x}$/NiFe, in which amount of Ni in the NiFe film is 45≦Ni≦85 wt %; and
a plated layer directly adjacent to said base layer, said plated layer being made of FeCo, wherein a crystal structure of said plated layer has X-ray diffraction peaks of bcc (110) and bcc (200), a ratio of diffracted intensity of bcc (110) and bcc (200) is I110/I200<0.8, a composition of said plated layer is indicated as $Fe_xCo_{1-x}$ (50≦x≦80 wt %), a saturation magnetic flux density (Bs) is Bs≧2.25 T, and a coercive force (Hc) in a direction of a hard axis is Hc≦600 A/m.

2. The magnetic thin film according to claim 1, wherein a crystal structure of said plated layer has X-ray diffraction peaks of bcc (110), bcc (200) and bcc (220).

3. The magnetic thin film according to claim 1, wherein a composition of said plated layer is indicated as $Fe_xCo_{1-x}$(65≦x≦75 wt %),
saturation magnetic flux density is Bs≧2.3 T, and
a coercive force in a direction of a hard axis is Hc≦400 A/m.

4. The magnetic thin film according to claim 1, wherein content of Ni in the NiFe part of said base layer is 45≦Ni≦85 wt %, and
the NiFe part has a fcc structure.

5. The magnetic thin film according to claim 1, wherein total thickness of said base layer is 100 nm or more, and
thickness of the NiFe part of said base layer is 10 nm or more.

6. A magnetic head of a magnetic disk drive unit, comprising:
an upper magnetic pole;
a lower magnetic pole;
a write-gap being formed between said upper magnetic pole and said lower magnetic pole; and
magnetic films being provided to parts of said upper magnetic pole and said lower magnetic pole, which are located at peripheries of said write-gap,
wherein each of said magnetic films comprises:
a base layer being made of $Fe_xCo_{1-x}$/NiFe; and
a plated layer being directly adjacent to said base layer, said plated layer being made of FeCo, wherein a crystal structure of said plated layer has X-ray diffraction peaks of bcc (110) and bcc (200), a ratio of diffracted intensity of bcc (110) and bcc (200) is I110/I200<0.8, a composition of said plated layer is indicated as $Fe_xCo_{1-x}$ (50≦x≦80 wt %), a saturation magnetic flux density (Bs) is Bs≧2.25 T, and a coercive force (Hc) in a direction of a hard axis is Hc≦600 A/m.

* * * * *